(12) United States Patent
Amine et al.

(10) Patent No.: US 7,695,860 B2
(45) Date of Patent: Apr. 13, 2010

(54) NONAQUEOUS LIQUID ELECTROLYTE

(75) Inventors: Khalil Amine, Downers Grove, IL (US);
Robert C. West, Madison, WI (US);
Qingzheng Wang, Glen Ellyn, IL (US);
Bookeun Oh, Lisle, IL (US); Donald R. Vissers, Naperville, IL (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1638 days.

(21) Appl. No.: 10/487,780

(22) PCT Filed: Mar. 20, 2003

(86) PCT No.: PCT/US03/08740

§ 371 (c)(1),
(2), (4) Date: Feb. 23, 2004

(87) PCT Pub. No.: WO03/083972

PCT Pub. Date: Oct. 9, 2003

(65) Prior Publication Data

US 2004/0197665 A1 Oct. 7, 2004

Related U.S. Application Data

(63) Continuation-in-part of application No. 10/167,490, filed on Jun. 13, 2002, now Pat. No. 6,798,018, which is a continuation-in-part of application No. 10/104,352, filed on Mar. 22, 2002, now abandoned.

(60) Provisional application No. 60/443,892, filed on Jan. 30, 2003, provisional application No. 60/446,848, filed on Feb. 11, 2003, provisional application No. 60/451,065, filed on Feb. 26, 2003.

(51) Int. Cl.
*H01M 6/04* (2006.01)
*H01M 6/14* (2006.01)

(52) U.S. Cl. ............... 429/188; 429/189; 429/300; 429/302

(58) Field of Classification Search .......... 429/188–189
See application file for complete search history.

(56) References Cited

U.S. PATENT DOCUMENTS 3,172,899 A    3/1965   Bailey (Continued)

FOREIGN PATENT DOCUMENTS

EP    0 450 981 A1    10/1991

(Continued)

OTHER PUBLICATIONS

M. Ue, Recent Technological Trend in Electrolyte Materials for Li-ion Batteries, Abstract 31, International Meeting on Lithium Batteries (IMLB 12), 2004, The Electrochemical Society, Inc.

(Continued)

*Primary Examiner*—Dah-Wei D Yuan
*Assistant Examiner*—Steven Scully
(74) *Attorney, Agent, or Firm*—Gavirolvich, Dodd & Lindsey LLP (57) ABSTRACT

Disclosed is a nonaqueous liquid electrolyte comprising poly (siloxane-g-3 ethylene oxide) and its synthesis. This electrolyte provides significant safety, improved electrochemical stability, improved conductivity, lower impedance, and lower manufacturing costs.

21 Claims, 6 Drawing Sheets

Sample W76 (n=6.3)

U.S. PATENT DOCUMENTS

| | | |
|---|---|---|
| 3,530,159 A | 9/1970 | Guinet et al. |
| 3,734,876 A | 5/1973 | Chu |
| 4,259,467 A | 3/1981 | Keogh et al. |
| 4,830,939 A | 5/1989 | Lee et al. |
| 4,849,856 A | 7/1989 | Funari et al. |
| 4,908,283 A | 3/1990 | Takahashi et al. |
| 5,037,712 A | 8/1991 | Shackle et al. |
| 5,112,512 A | 5/1992 | Nakamura |
| 5,272,021 A | 12/1993 | Asai et al. |
| 5,300,375 A | 4/1994 | Chaloner-Gill |
| 5,362,493 A | 11/1994 | Skotheim et al. |
| 5,419,984 A | 5/1995 | Chaloner-Gill et al. |
| 5,475,127 A | 12/1995 | Klein et al. |
| 5,538,812 A | 7/1996 | Lee et al. |
| 5,593,787 A | 1/1997 | Dauth et al. |
| 5,609,974 A | 3/1997 | Sun |
| 5,633,098 A | 5/1997 | Narang et al. |
| 5,690,702 A | 11/1997 | Skotheim et al. |
| 5,700,300 A | 12/1997 | Jensen et al. |
| 5,731,104 A | 3/1998 | Ventura et al. |
| 5,753,389 A | 5/1998 | Gan et al. |
| 5,772,934 A | 6/1998 | MacFadden |
| 5,882,812 A | 3/1999 | Visco et al. |
| 5,885,733 A | 3/1999 | Ohsawa et al. |
| 5,919,587 A | 7/1999 | Mukherjee et al. |
| 5,961,672 A | 10/1999 | Skotheim et al. |
| 6,013,393 A | 1/2000 | Taniuchi et al. |
| 6,015,638 A | 1/2000 | Ventura et al. |
| 6,124,062 A | 9/2000 | Horie et al. |
| 6,168,885 B1 | 1/2001 | Narang et al. |
| 6,181,545 B1 | 1/2001 | Amatucci et al. |
| 6,245,465 B1 | 6/2001 | Angell et al. |
| 6,248,481 B1 | 6/2001 | Visco et al. |
| 6,252,762 B1 | 6/2001 | Amatucci |
| 6,268,088 B1 | 7/2001 | Oh et al. |
| 6,337,383 B1 | 1/2002 | West et al. |
| 6,447,952 B1 | 9/2002 | Spiegel et al. |
| 6,482,912 B2 | 11/2002 | Boudjouk et al. |
| 6,495,287 B1 | 12/2002 | Kolb et al. |
| 6,573,009 B1 | 6/2003 | Noda et al. |
| 6,610,109 B2 | 8/2003 | Noh |
| 6,653,015 B2 | 11/2003 | Yoshida et al. |
| 2002/0028388 A1 | 3/2002 | Lee |
| 2002/0051911 A1 | 5/2002 | Okada |
| 2002/0192554 A1 | 12/2002 | Woo et al. |
| 2003/0036003 A1 | 2/2003 | Shchori et al. |
| 2003/0099884 A1 | 5/2003 | Chiang et al. |
| 2003/0104282 A1 | 6/2003 | Xing et al. |
| 2003/0180624 A1 | 9/2003 | Oh et al. |
| 2003/0180625 A1 | 9/2003 | Oh et al. |
| 2003/0198869 A1 | 10/2003 | West et al. |
| 2004/0197668 A1 | 10/2004 | Jung et al. |

FOREIGN PATENT DOCUMENTS

| | | |
|---|---|---|
| EP | 0 525 728 A1 | 2/1993 |
| EP | 0 581 296 A2 | 2/1994 |
| EP | 0 581 296 A3 | 2/1994 |
| EP | 0 450 981 B1 | 6/1995 |
| EP | 0 922 049 B1 | 2/1998 |
| EP | 0 932 215 A1 | 1/1999 |
| EP | 0 796 511 B1 | 8/1999 |
| EP | 1 024 502 A1 | 8/2000 |
| EP | 0 932 215 B1 | 5/2001 |
| EP | 1 202 374 A1 | 5/2002 |
| JP | 57-034661 | 2/1982 |
| JP | 57-034662 | 2/1982 |
| JP | 57-080670 | 5/1982 |
| JP | 57-111957 | 7/1982 |
| JP | 57-176669 A2 | 10/1982 |
| JP | 59-224072 A2 | 12/1984 |
| JP | 60-195877 | 10/1985 |
| JP | 60-216461 | 10/1985 |
| JP | 61-288374 | 12/1986 |
| JP | 62-209169 A2 | 9/1987 |
| JP | 63-010466 | 1/1988 |
| JP | 63-310569 | 12/1988 |
| JP | 02-080462 | 3/1990 |
| JP | 02-262274 | 10/1990 |
| JP | 02-291603 | 12/1990 |
| JP | 03-139566 | 6/1991 |
| JP | 60-052893 A2 | 7/1992 |
| JP | 05-036441 | 2/1993 |
| JP | 05-290616 | 11/1993 |
| JP | 07-320782 | 12/1995 |
| JP | 08-078053 A2 | 3/1996 |
| JP | 09-306544 | 11/1997 |
| JP | 11-214032 A2 | 1/1998 |
| JP | 11-302384 A2 | 4/1998 |
| JP | 10-172615 A2 | 6/1998 |
| JP | 11-185804 | 7/1999 |
| JP | 11-238523 | 8/1999 |
| JP | 11-302383 | 11/1999 |
| JP | 11-306856 A2 | 11/1999 |
| JP | 11-306857 A2 | 11/1999 |
| JP | 2000-058123 | 2/2000 |
| JP | 2000-154254 A2 | 6/2000 |
| JP | 2000-222939 A2 | 8/2000 |
| JP | 2000-277152 A2 | 10/2000 |
| JP | 2001-068115 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-063936 A2 | 2/2002 |
| JP | 2002-151150 A2 | 5/2002 |
| JP | 2002-155142 A2 | 5/2002 |
| JP | 2002-298913 A2 | 10/2002 |
| JP | 2002-343440 A2 | 11/2002 |
| JP | 2003-002974 A2 | 1/2003 |
| WO | WO 96/21853 | 7/1996 |
| WO | WO 98/07729 A1 | 2/1998 |
| WO | WO 00/00495 A1 | 1/2000 |
| WO | WO 00/08654 | 2/2000 |
| WO | WO 00/25323 | 5/2000 |
| WO | WO 00/25323 A1 | 5/2000 |
| WO | WO 01/73884 A1 | 10/2001 |
| WO | WO 01/96446 A1 | 12/2001 |
| WO | WO 01/99209 A2 | 12/2001 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

R. Zhang et al., Modification of Polymethylhydrosiloxane by Dehydrocoupling Reactions Catalyzed by TransItIon Metal Complexes: Evidence for the Preservation of Linear Siloxane Structures, Silicon Chemistry, 2003, vol. 2, 271-277.

Z. Zhang et al., Network-Type Ionic Conductors Based on Oligoethyleneoxy-FunctIonalized PentamethylcyclopentasIloxanes, Macromolecules. 2005, vol. 38, 5714-5720.

Z. Zhang et al., Synthesis and Ionic Conductivity of CyclosIloxanes with Ethyleneoxy-Containing Substituents, Chem. Mater., 2005, vol. 17, 5646-5650.

M. Armand, New Electrode Material, Proceedings of the NATO Sponsored Advanced Study Institute on Fast Ion Transport in Solids, Solid State Batteries and Devices, 1972; Belgirate, Italy.

D. Fenton et al., Complexes of Alkali Metal Ions with Poly(Ethylene Oxide), Polymer, 1973, 589, 14.

E. Tsuchida et al., Conduction of Lithium Ions in Polyvinylidene Fluoride and its Derivates-I, Electrochimica Acta, 1983, 591-595, 28(5).

L. Hardy et al., Chloride Ion Conductivity in a Plasticzed Quaternary Ammonium Polymer, Macromolecules, 1984, 975-977, 17.

P. Blonsky et al., Polyphosphazene Solid Electrolytes, Journal of American Chemical Society, 1984, 6854-6855, 106.

I. Kelly et al., Poly(Ethylene Oxide) Electrolytes for Operation at Near Room Temperature, Journal of Power Sources, 1985, 13-21, 14.

D. Bannister et al., A Water-Soluble Siloxane: Poly(ethylene glycol) Comb Polymer, Journal of Polymer Science: Polymer Letters Edition, 1985, 465-467, 23.

D. Fish et al., Conductivity of Solid Complexes of Lithium Perchlorate with Poly{[w-methoxyhexa(oxyethylene)ethoxy]methylsiloxane} $^{a)}$, Makromol. Chem., Rapid Commun., 1986, 115-120, 7.

P. Hall et al. Ion Conductivity in Polysiloxane Comb Polymers With Ethylene Glycol Teeth, Polymer Communications, 1986, 3 pages, 27.

R. Spindler et al., Investigations of a Siloxane-Based Polymer Electrolyte Employing $^{13}$C, $^{29}$Si, $^{7}$Li, and $^{23}$Na Solid State NMR Spectroscopy, Journal of American Chemical Society, 1988, 3036-3043, 110.

R. Spindler et al, Synthesis NMR Characterization, and Electrical Properties of Siloxane-Based Polymer Electrolytes, Macromolecules, 1988, 648-654, 21.

S. Ganapathiappan et al., A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules, 1988, 2684-2689, 21.

D. Fish et al., Polymer Electrolyte Complexes of $ClO_4$ and Comb Polymers of Siloxane with Oligooxyethylene Side Chains, British Polymer Journal, 1988, 281-288, 20, 3.

S. Ganapathiappan et al., Synthesis, Characterization and Electrical Response of Phosphazene Polyelectrolytes, Journal of America Chemical Society, 1989, 4091-4095, 111.

M. Ouchi et al., Convenient and Efficient Tosylation of Oligoethylene Glycois and the Related Alcohols in Tetrahydrofuran-Water in the Presence of Sodium Hydroxide, The Chemical Society of Japan, 1990, 1260-1262, 63, 4.

L. Dominey et al., Thermally Stable Lithium Salts for Polymer Electrolytes, Electrochimica Acta, 1992, 1551-1554, 37(9).

G. Zhou et al., Solvent-Free Cation-Conduction Polysiloxane Electrolytes with Pendant Oligo(oxyethylene) and Sulfonate Groups, Macromolecules, 1993, 2202-2208, 26.

F. Alloin et al., Triblock Copolymers and Networks Incorporating Oligo (Oxyethylene) Chains, Solid State Ionics, 1993, 3-9, 60.

C. St. Pierre et al., Lithium-Metal-Polymer Battery for Electric Vehicle and Hybrid Electric Vehicle Applications, www.avestor.com/en/automotive.html, info@avestor.com, 1993, 11 pages.

M. Gauthier et al., Large Lithium Polymer Battery Development The Immobile Solvent Concept, Journal of Power Sources, 1995, 163-169, 54.

H. Allcock et al., Polyphosphazenes Bearing Branched and Linear Oligoethyleneoxy Side Groups as Solid Solvents for Ionic Conduction, Macromolecules, 1996, 7544-7552, 29.

S. Kohama et al., Alcoholysis of Poly(methylhydrogensiloxane), Journal of Applied Sciences, 1997, 21, 863-867.

J. Gnanaraj et al., Studies on Comb-like Polymer Blend with Poly(Ethylene Oxide)—Lithium Perchlorate Salt Complex Electrolyte, Polymer, 1997, 3709-3712, 38(14).

M. Furlani et al., Time Resolved Luminescence and Vibrational Spectroscopic Studies on Complexes of Poly(Ethylene Oxide) Oligomers and $Eu(TFSI)_3$ Salt, $11^{th}$ International Conference on Solid State Ionics, 1997, 10 pages.

K. Abraham et al., Highly Conductive PEO-Like Polymer Electrolytes, Journal of Chemical Materials, 1997, 1978-1988, 9(9).

Z. Wang et al., Thermal, Electrochemical, and Spectroscopic Characterizations of Hyperbranched Polymer Electrolyte, Journal of Electrochemical Society, 1999, 2209-2215, 146(6).

R. Hopper et al., A Highly Conductive Solid-State Polymer Electrolyte Based on a Double-Comb Polysiloxane Polymer with Oligo(Ethylene Oxide) Side Chains, Organometallics, American Chemical Society, 1999, 3249-3251, 18(17).

J. Blackwell et al., $B(C_6F_5)_3$-Catalyzed Silation of Alcohols: A Mild, General Method for Synthesis for Silyl Ethers, Journal of Organic Chemistry, 1999, 4887-4892, 64.

M. Anderman et al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol)$_n$ Dimethacrylates—Thermal, Mechanical and Electrochemical Properties in Relationship to the Network Structure, Polymer, 2000, 3821-3836, 41.

X. Hou et al., Novel Interpenetrating Polymer Network Electrolytes, Polymer, 2001, 4181-4188, 42.

R. Hooper et al., Highly Conductive Siloxane Polymers, Macromolecules, 2001, 931-936, 34.

C.F. Rome, The Unique Properties of Silicone at the Service of the Petroleum Industry, Hydrocarbon Asia, 2001, 42-49, 'www.hcasia.safan.com/mag/may-jun01/Tech-Silicone.pdf'.

W. Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).

N. Katayama et al., Thermal Stability of Propylene Carbonate and Ethylene Carbonate-Propylene Carbonate-Based Electrolytes for Use in Li Cells, Journal of Power Sources, 2002, 321-326, 109(2), http://www.sciencedirect.com/web-editions.

C. Letourneau et al., Progress in Lithium-Metal-Polymer Battery System for Electric Vehicles, www.avestor.com/en/automotive.html, info@avestor.com, Canada, 1-10.

F. Gray, Polymer Electrolytes, RSC Materials Monographs, UK, 46-49.

D.R. MacFarlane et al., Synthesis and Aqueous Solution Phase Behavior of Siloxane-Poly (Alkylene Glycol) Comb Copolymers, Department of Chemistry, Monash University, Clayton, Victoria, Australia, 405-406.

K. Xu et al., LiBOB as Salt for Lithium-Ion Batteries, Electrochemical and Solid State Letters, 2002, pp. A26-A29, vol. 5(1).

J. Alper, The Battery: Not Yet a Terminal Case, Science, 2002, 1224-1226, vol. 296, www.sciencemag.org.

Oh et al., Solid Polymer Electrolyte And Method of Preparation, U.S. Appl. No. 10/104,352, filed Mar. 22, 2002.

Oh et al., Nonaqueous Liquid Electrolyte, U.S. Appl. No. 10/167,940, filed Jun. 12, 2002.

Nicodom Ltd., Inorganic Library of FT-IR Spectra Inorganics II—Boron Compounds, homepage, website http://www.ftir.cz/INLIB2.html and http://www.ftir.cz/home$_{13}$ page_of_nicodom_sro.htm.

W. Xu et al., Ionic Conductivity and Electrochemical Properties of Lithium Orthoborate Salts, http://www.electrochem.org/meetings/past/200/abstracts/symposia/bla/0107.pdf, United States.

T. Fujii et al., Application of LiBOB as an Electrolyte Salt for 4 V Class Lithium Ion Rechargeable Cells, whttp://www2.electrochem.org/cgi-bin/abs?mtg=202&abs=0203, United States.

B. Oh et al., New Electrolyte Network-Type Siloxane Polymer Electrolyte, Electrochemical and Solid State Letters, 2002, E59-E61, 5(11), The Electrochemical Society, Inc.

International Search Report, dated Jul. 11, 2003, received in relation to Application No. PCT/US03/02128.

International Search Report, dated Jul. 11, 2003, received in relation to Application No. PCT/US03/08740.

International Search Report, dated Sep. 12, 2003, received in relation to Application No. PCT/US03/08784.

International Search Report, dated Oct. 9, 2003, received in relation to Application No. PCT/US03/08783.

International Search Report, dated Oct. 9, 2003, received in relation to Application No. PCT/US03/08779.

International Search Report, dated May 1, 2003, received in relation to Application No. PCT/US03/02127.

Y. Kang at al., Solid Polymer Electrolytes based on Cross-linked Siloxane-g-oligoethylene oxide: Ionic conductivity and Electrochemical Properties, Abstract book of 11th International Meeting on Lithium Batteries (IMLB 11), Jun. 23-28, 2002.

Y. Kang et al., Solid Polymer Electrolytes Based on Cross-Linked Polysiloxane-g-oligo(ethylene oxide): Ionic Conductivity and Electrochemical Properties, Journal of Power Sources 119-121 (Jun. 1, 2003), pp. 448-453.

W. Xu et al., Structures of Orthoborate Anions and Physical Properties of Their Lithium Salt Nonaqueous Solutions, Journal of the Electrochemical Society, 2003, 150(1), E74-E80.

Z. Zhang et al., Cross-Linked Network Polymer Electrolytes Based on a Polysiloxane Backbone with Oligo(Oxyethylene) Side Chains: Synthesis and Conductivity, Macromolecules, Oct. 28, 2003, vol. 36, No. 24, 9176-9180.

Sample W76 (n=6.3)

Fig. 4A

Sample W22P (n = 32 – 38; $K_2CO_3$, catalyst)
Sample W102 (n = 33-35; $B(C_6F_5)_3$ catalyst)

NONAQUEOUS LIQUID ELECTROLYTE

REFERENCE TO PRIOR FILED APPLICATIONS

This application claims priority to copending provisional application Ser. No. 60/451,065 entitled "Method for Fabricating Composite Electrodes" filed Feb. 26, 2003; and to copending provisional application Ser. No. 60/446,848 entitled "Polymer Electrolyte for Electrochemical Cell" filed Feb. 11, 2003; and to copending provisional application Ser. No. 60/443,892 entitled "Nonaqueous Liquid Electrolyte" filed Jan. 30, 2003; and to PCT/US03/02127 filed Jan. 22, 2003; and to PCT/US0302128 filed Jan. 22, 2003; and is a Continuation-in-Part of application Ser. No. 10/167,490 filed Jun. 13, 2002 now U.S. Pat. No. 6,798,018, which is a Continuation-in-Part of application Ser. No. 10/104,352, filed Mar. 22, 2002 now abandoned, the disclosure of each of which is incorporated herein by reference.

GOVERNMENT LICENSE RIGHTS

This invention was made with United States Government support under NIST ATP Award No. 70NANB043022 awarded by the National Institute of Standards and Technology (NIST) and NSF 9810623. The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144 LM01, Subcontract No. AGT DTD Sep. 9, 2002, and NSF 9810623.

TECHNICAL FIELD

The present invention relates to electrochemical storage devices containing a nonaqueous polymer electrolyte with high ionic conductivity, low impedance, and high thermal stability. More particularly the present invention relates to polysiloxane type electrolytes for electrochemical storage devices.

BACKGROUND

The demand for lithium secondary batteries to meet high power and high-energy system applications has resulted in substantial research and development activities to improve their safety, as well as performance. As the world becomes increasingly dependent on portable electronic devices, and looks toward increased use of electrochemical storage devices for vehicles, power distribution load leveling and the like, it is increasingly important that the safety of such devices be paramount, especially as these devices are being used in such environments as airliners and space vehicles. The effort to date has included research in flame-retardants, solid polymer electrolytes, and new electrolyte concepts with improved thermostability. Thus, the development of highly conductive electrolytes, free of any problems associated with volatile and combustible solvents, is of paramount importance. Polymer electrolytes have a number of advantages over the materials currently used in high-performance batteries. Compared to conventional batteries using heavy metals such as lead, nickel, and cadmium, the lithium-based polymer electrolyte batteries would be many times lighter. The proposed designs of these batteries would also allow them to be formed into various shapes besides the traditional cylindrical or rectangular shapes typical in regular batteries. (See, Gray, F. M. *Solid Polymer Electrolytes*; VCH Publishers: New York, 1991, at 1-4, 5-21). These advantages have fueled commercial interests and research interests into improving the conductive properties of polymer electrolytes. Poly(ethylene oxide) (PEO) has been known to dissolve alkali metal salts and exhibit conductivity since the early 1970's. (See, Fenton, D. E.; Parker, J. M.; Wright, P. V. *Polymer* 1973, 14, at 589). The properties of PEO have been studied extensively and are outlined in a number of review articles and texts. (See Gray supra; See also, Shriver, D. F.; Bruce, P. G. in *Solid State Electrochemistry*, P. G. Bruce, ed., Cambridge University Press: New York, 1995, at 95, 97-106). Of more recent interest has been a class of polymers with Si—O backbones known as polysiloxanes. (See, Mark, J. E.; Allcock, H. R.; West, R. *Inorganic Polymers*; Prentice Hall: N.J., 1992, at 3). The Si—O backbone of these polymers is highly flexible, yet retains its chemical and thermal integrity. Polysiloxanes also have low glass transition temperatures, $T_g$, and, when substituted with oligoethylene oxide groups, solvate lithium salts, making the polysiloxanes good candidates for potentially useful polymer electrolytes. (See, Hooper, R.; Lyons, L. J.; Mapes, M. K.; Schumacher, D.; Moline, D. A.; West, R. *Macromolecules* 2001, 34, 931. R. Hooper, L. J. Lyons, D. A. Moline, R. West, *Silicon Chemistry* 2002, 1, at 121; Lin, C.; Kao, H.; Wu, R.; Kuo, P. *Macromolecules* 2002, 35, at 3083; Zhou, G.; Khan, I. M.; Smid, J. *Macromolecules* 1993, 26, at 2202; Siska, D. P.; Shriver, D. F. *Chem. Mater* 2001, 13, at 4698; Zhu, Z.; Einset, A. G.; Yang, C.; Chen, W.; Wnek, G. E. Zhu, Z.; Einset, A. G.; Yang, C.; Chen, W.; Wnek, G. E. *Macromolecules* 1994, 27, at 4076; Zhu, Z.; Einset, A. G.; Yang, C.; Chen, W.; Wnek, G. E.; Fish, D; Khan, I. M.; Wu, E.; Smid, J. *British Polymer Journal* 1988, 20, at 286; Morales, E.; Acosta, J. L. *Electrochimica Acta* 1999, 45, at 1049.)

The present inventors synthesized the polysiloxane polymers of the present invention with the goal of creating low viscosity, low molecular weight samples to enhance ionic conductivity.

A primary objective of the present invention is to provide a high conductivity, safe liquid electrolyte for use in electrochemical storage devices, especially lithium secondary batteries, as well as super capacitors and hybrid devices.

Another objective is to provide a safe electrolyte that is easy and inexpensive to manufacture.

Yet another objective is to provide an electrolyte for medical and high energy applications.

SUMMARY

Accordingly, the present invention relates to electrochemical storage devices, especially lithium-based secondary batteries, with a nonaqueous and nonvolatile polymeric electrolyte with high room temperature ionic conductivity and enhanced safety.

To fulfill the above objectives, the nonaqueous and nonvolatile polymeric electrolyte solutions in the present invention are prepared by using the compositions which comprise poly(siloxane-g-ethylene oxide) in a liquid state with proper viscosity and a dissolved lithium salt.

DETAILED DESCRIPTION

Poly(siloxane-g-ethylene oxide) (see General Formula I below) electrolyte shows outstanding flame resistance. Its propagation rate is significantly lower than conventional liquid electrolyte for lithium ion batteries and low molecular weight polyethylene oxide electrolyte. This is because the inorganic siloxane backbone naturally acts as a combustion inhibitor, resulting in a two stage combustion process. The initial stage involves decomposition of the stable polymer into flammable volatile by-products. For polysiloxanes such as our electrolyte, this requires a lot of energy due to the strength of the Si—O backbone. This means that in order for combustion to occur, the heat added must be sufficient to decompose the polymer, ignite the by-products, and transfer enough heat back to the polymer to the sustain the reaction. Additionally, our polymer is more thermally stable than the carbonates presently used in the industry as a standard. This is stability arises from the polymer's large molecular size, non-volatile nature and the higher temperatures required to vaporize. The Si—O backbone also gives this polymer the added benefit of being nontoxic. The thermal stability and nontoxicity of this polymer electrolyte make it particularly well suited for medical device applications, especially implanted batteries for such devices as cardiac assist pumps, insulin pumps, neuromuscular stimulators, cardiac pacemakers, automatic defibrillators, cochlear implants, and other bioelectronic devices. The usage of this polymer in place of the traditional carbonates in medical device batteries would substantially improve safety. The polymer electrolyte of the present invention is also well suited for high energy applications such as electric and hybrid vehicles, submarines, satellites, and load-leveling installations.

Example 1

Figure 1:
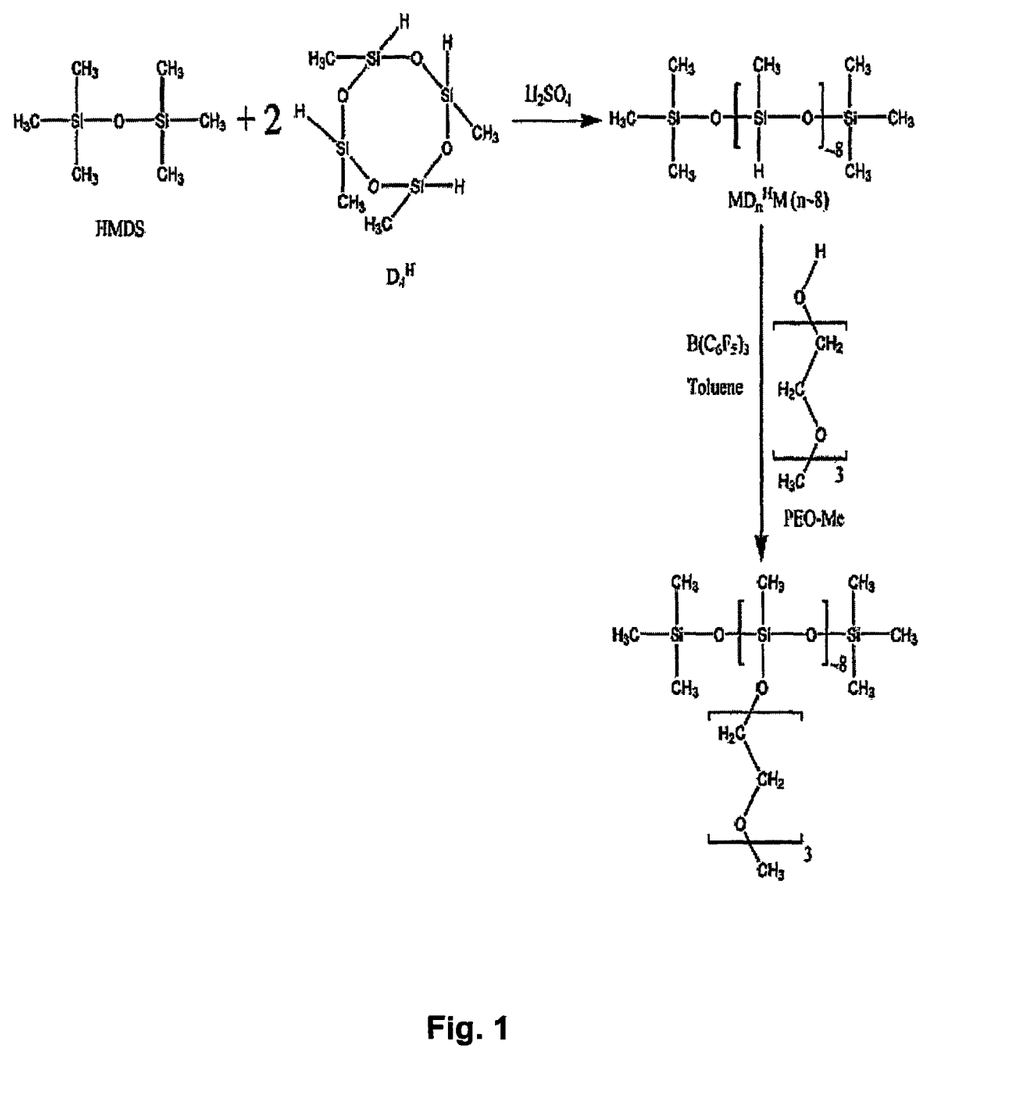
FIG. 1 is a visual summary of the synthesis of poly(siloxane-g-3 ethylene oxide) (n~8), (Sample W100).

Referring to FIG. 1, a visual summary of the synthesis, the liquid polymer electrolyte of the form visually depicted by General Formula I was synthesized.

General Formula I

In particular, a species of this type with (n~8 and m=0), labeled W100 poly(siloxane-g-3 ethylene oxide) (n~8) (General Formula II) was synthesized using commercially available precursors involved in two major steps, as described below. Note R4 is [—O-(alkylene oxide)k-R11] wherein R11 is alkyl group. Note further that viscosity increases with n, becoming a solid at values exceeding about 20. Preferably, n should range from 4 to 20, more preferably from 4 to 12, and most preferably approximately 8. R1, R2, R3, R8, R9 and R10 are preferably chosen from the group consisting of: methyl, ethyl, propyl, and butyl. R5, R6 and R7 are preferably chosen from the group consisting of: methyl, ethyl, propyl, and butyl.

General Formula II

Step 1: Ring Opening Polymerization Synthesizing a $MD_n{}^H M$ (n~8) Intermediary The commercially available compounds 1,3,5,7-tetramethylcyclotetrasiloxane ($D_4{}^H$, Gelest Inc., 68.59 g or 0.286 mol) (General Formula III) and hexamethyldisiloxane (HMDS, Aldrich, 23.15 g or 0.143 mol) (a disiloxane described by General Formula IV for the case wherein, R1=R2=R3=R8=R9=R10=CH3) were used as precursor materials.

General Formula III: Chemical Structure of $D_4{}^H$

General Formula IV: Chemical Structure of Disiloxane

Note that alternate precursor materials may be used such as cyclical polysiloxane with three to ten silicon-oxygen repeating units, for example:

$D_3{}^H$: 1,3,5-trimethylcyclotrisiloxane,
$D_4{}^H$: 1,3,5,7-tetramethylcyclotetrasiloxane (as used in Example 1),
$D_5{}^H$: 1,3,5,7,9-pentamethylcyclopentasiloxane,
$D_6{}^H$: 1,3,5,7,9,1-hexamethylcyclohexasiloxane,
$D_7{}^H$: 1,3,5,7,9,11,13-heptamethylcycloheptasiloxane,
$D_8{}^H$: 1,3,5,7,9,11,13,15-octamethylcyclooctasiloxane,
$D_9{}^H$: 1,3,5,7,9,11,13,15,17-nonamethylcyclononasiloxane, or
$D_{10}{}^H$: 1,3,5,7,9,11,13,15,17,19-decamethylcylcodecasiloxane.

Preferred is from about three to about five silicon-oxygen repeating units.

A ring opening polymerization of the cyclic compound was performed through the addition of a chain-stopping compound, HMDS (in a 1:2 molar ratio), in the presence of concentrated sulfuric acid (2.6% by wt, Fisher Scientific, 1.85 g) and stirred at 60° C. for 24 hours. The 1:2 ratio was used in this preferred example; however, the ratio is not limited to 1:2. Preferably, the chain-stopping compound is added in an amount sufficient to limit final chain lengths to n=4 to 20. For example, if the ratio is 2 $D_4^H$:1 disiloxane, n will be ~8; for 3 $D_4^H$:1 disiloxane, n will be ~12; etc.

The resulting mixture was then allowed to return to room temperature and washed with 10% $NaHCO_3$ (3×15 ml) and deionized water (6×10 ml). This liquid was dissolved in diethyl ether (200 ml) and then dried over $Na_2SO_4$. The diethyl ether solvent was removed on a rotary evaporator. The sample was then again dried at 70° C. under vacuum (0.05 torr) overnight (about 16 hours). At this step Nuclear Magnetic Resonance (NMR) characterization was performed on the current product, $MD_n^HM$ (n~8) (General Formula V, with a more generalized chemical structure of the Intermediary shown in General Formula VI), yielding a spectrum consistent with the proposed structure (Table 2). R1, R2, R3, R8, R9 and R10 are preferably chosen from the group consisting of: methyl, ethyl, propyl, and butyl. R5, R6 and R7 are preferably chosen from the group consisting of: methyl, ethyl, propyl and butyl.

General Formula V: Chemical Structure of $MD_n^HM$ (n~8)

General Formula VI: Generalized Chemical Structure of Intermediary wherein at least R4 or R5 is H.

TABLE 2

NMR Spectra of $MD_n^HM$ (n~8)

| NMR Spectra (in $CDCl_3$) | Line 1 (ppm) | Line 2 (ppm) |
|---|---|---|
| $^1H$ | 4.70 (broad, 1H, Si—H) | 0.21~0.12 (m, 5.3H, Si—$CH_3$) |
| $^{29}Si$ | 9.55 (m, O—Si($CH_3$)$_3$), | −35.17 (Si—H) |

Step 2: Addition of a PEO Side-chain

The above sample $MD_n^HM$ (n~8) (48.54 g, 0.617 mol Si—H) was then mixed in a 500 ml flame dried flask containing tri(ethyleneglycol) monomethyl ether (PEO—Me) (k=3) (Aldrich, 101.22 g or 0.617 mol) (described by the General Formula VII for the case wherein k=3). Also added to the mixture was tris(pentafluorophenyl)boron, $B(C_6F_5)_3$, (Aldrich, 0.16 g or 0.31 mmol) (General Formula VIII), which served as a catalyst for the dehydrocoupling reaction which occurs between the Si—H groups of the $MD_n^HM$ (n~8) and the O—H groups of the PEO—Me (m=3). Note, the dehydrocoupling catalyst should be loaded as a percentage of the moles of Si—H groups present in the substrates, preferably between 0.01% and 10%, more preferably between 0.01% and 2.00%, and most preferably about 0.05% on a per mole basis. This mixture was vacuum pumped down (~0.05 torr) and then filled with argon, four times in succession. Next, a solvent (150 mL toluene, dried over sodium) was added and the entire mixture was heated to 70-75° C., which caused bubbling to occur. Other solvents such as benzene may be used in place of toluene, and the mixture may be heated to between 40° C. and 200° C. The mix was then stirred until this bubbling ceased, approximately 17 hours. The sample was then further dried at 125° C. under vacuum (0.02 torr) to generate a colorless oil (137.6 g). Infrared spectroscopy (IR) showed the absence of H—O or Si—H groups, an indication that our reaction proceeded to completion. Table 3 shows the spectra resulting from the NMR, similarly indicative of the absence of H—O or Si—H groups, and that the reaction proceeded to completion (Table 3). Detecting traces of boron via mass spectroscopy, FTIR, X-ray diffraction, and/or neutron diffraction in a polysiloxane, and in particular in poly (siloxane-g-3 ethylene oxide) (n~8), could be used to reveal that our inventive employment of a boron catalyst was utilized. It is noted that, although boron is considered the best catalyst, alternate catalysts including alkali metal or alkaline earth hydroxides, alkali metal or alkaline earth carbonates, triethylamine, and pyridine may be used. See, S. Kohama, Y Umeki, J., Applied Polymer Sci., 21, 863 (1977). For example, and without limitation, zinc octanoate, triethylamine, pyridine, potassium hydroxide, magnesium hydroxide, potassium carbonate may be used. Experiments have further demonstrated that a rhodium complex, $RhCl(PPh_3)_3$, is an efficient catalyst but produces a dark color in the polymer which is difficult to remove.

General Formula VII: Chemical Structure of PEO—Me

General Formula VIII: Chemical Structure of $B(C_6F_5)_3$

TABLE 3

NMR Spectra of Sample W100

| NMR Spectra (in $CDCl_3$) | Line 1 (ppm) | Line 2 (ppm) | Line 3 (ppm) |
|---|---|---|---|
| $^1H$ | 3.70~3.30 (m, 12H, $CH_2$) | 3.15 (s, 3H, $OCH_3$) | 0.05~−0.10 (m, 5.1H, Si—$CH_3$) |

Properties

Ionic Conductivity: When doped, Sample W100, by virtue of its low molecular weight and viscosity, displays high levels of ionic conductivity. The sample was initially dried on a high vacuum line (pressure reached 9.5×10$^{-5}$ torr) following synthesis. Before testing the samples were doped with the lithium salt, $LiN(SO_2CF_3)_2$ (LiTFSI) at various concentrations. These concentrations were calculated based on the molar ratios between the amount of side-chain oxygen molecules in the sample and lithium cations present in the salt (Table 4). Alternate candidate alkali metal salts include the lithium salts: $LiClO_4$, $LiBF_4$, $LiAsF_6$, $LiPF_6$, $LiCF_3SO_3$, $Li(CF_3SO_2)_2N$, $LiC(CF_3SO_2)_3$, $LiN(SO_2C_2F_5)_2$, lithium bis(oxalato) borate ("LiBOB"), lithium alkyl fluorophosphates, and mixtures thereof. Other salts may be used, particularly those comprising at least one quaternary ammonium salt having an anion selected from the following groups: $ClO_4^-$, $BF_4^-$, $AsF_6^-$, $PF_6^-$, $CF_3SO_3^-$, $(CF_3SO_2)_2N^-$, $C(CF_3SO_2)_3C^-$, $(C_2F_5SO_2)_2N^-$, $PF_3(C_2F_5)_3^-$, $PF_3(CF_3)_3^-$ and $B(C_2O_4)_2$.

TABLE 4

LiTFSI Doping of Sample W100

| EO:Li | Sample W100 (g) | LiTFSI (g) |
|---|---|---|
| 24.1:1 | 1.58 | 0.24 |
| 15.1:1 | 1.49 | 0.37 |

This doping was achieved through one of two methods. The first involves direct doping of the salt and polymer by placing them in a Nalgene cup in an argon atmosphere dry box. Once inside the box the mixture was placed in a drying tube containing a Teflon stir bar. Next the tube was removed from the dry box and placed on a Schlenk line to enable the sample and salt to mix under an argon flow until homogenous mixing occurred. The criterion used to evaluate this level of mixing was the absence of salt crystals based on unaided visual inspections. This was achieved following several hours (overnight) of constant stirring. The second, or solution, method involves placing the desired amount of sample in a Nalgene cup that is then transferred to a sealed drying tube with a Teflon stir bar within the dry box. The salt is transferred into the tube through a syringe containing 0.052 M LiTFSI in a tetrahydrofuran (THF) solution under an argon flow. The mix was then allowed to stir to achieve homogeneity on a Schlenk line. The THF solvent is removed on the Schlenk line and the tube is then placed on a high vacuum line until a pressure below $3 \times 10^{-5}$ torr is reached. The direct doping method was used in the preparation of doped Sample W100.

The solution doping method was used when less than 15 mg of salt will be used since that small amount of salt cannot be measured precisely in a dry box. When using 50 to 100 mg of salt, precise amounts can be measured in a dry box allowing the use of the direct method, which does not expose the sample to additional solvent (which then needs to be removed). Sample W100 was mixed with the direct method since about 100 mg of salt was added to the pure polymers. It is quicker and ensures that no additional solvent needs to be used.

Sandwich conductivity cells sealed with o-rings were used to measure conductivity. The cells were placed in the dry box and had their dimensions measured to enable the calculation of conductivity according to the equation, $$\sigma = \frac{L}{RA},$$

where $\sigma$ is conductivity (S/cm), L is the length of the containment ring (cm), R is the resistance ($\Omega$) and A is area ($cm^2$). Three (3) different containment rings were used on our cells, giving geometric factors $$\frac{L}{(A)}$$

between 0.208 and 0.293 $cm^{-1}$. Resistance was derived from impedance measurements according to the following equation, $R = Z \times \cos(\theta)$, where Z is impedance ($\Omega$) and $\theta$ corresponds to the phase angle. These values were measured by a Princeton Applied Research Potentiostat/Galvanostat Model 273A with a Model 1025 Frequency Response Analyzer using PAR PowerSine software. The parameters for these tests were a frequency range of between 75.0 Hz and 100 kHz and a default AC amplitude of 10 mV. Variations in temperature were achieved using a condenser connected to a Brinkman MGW Lauda RM 6 circulating bath.

Figure 2:
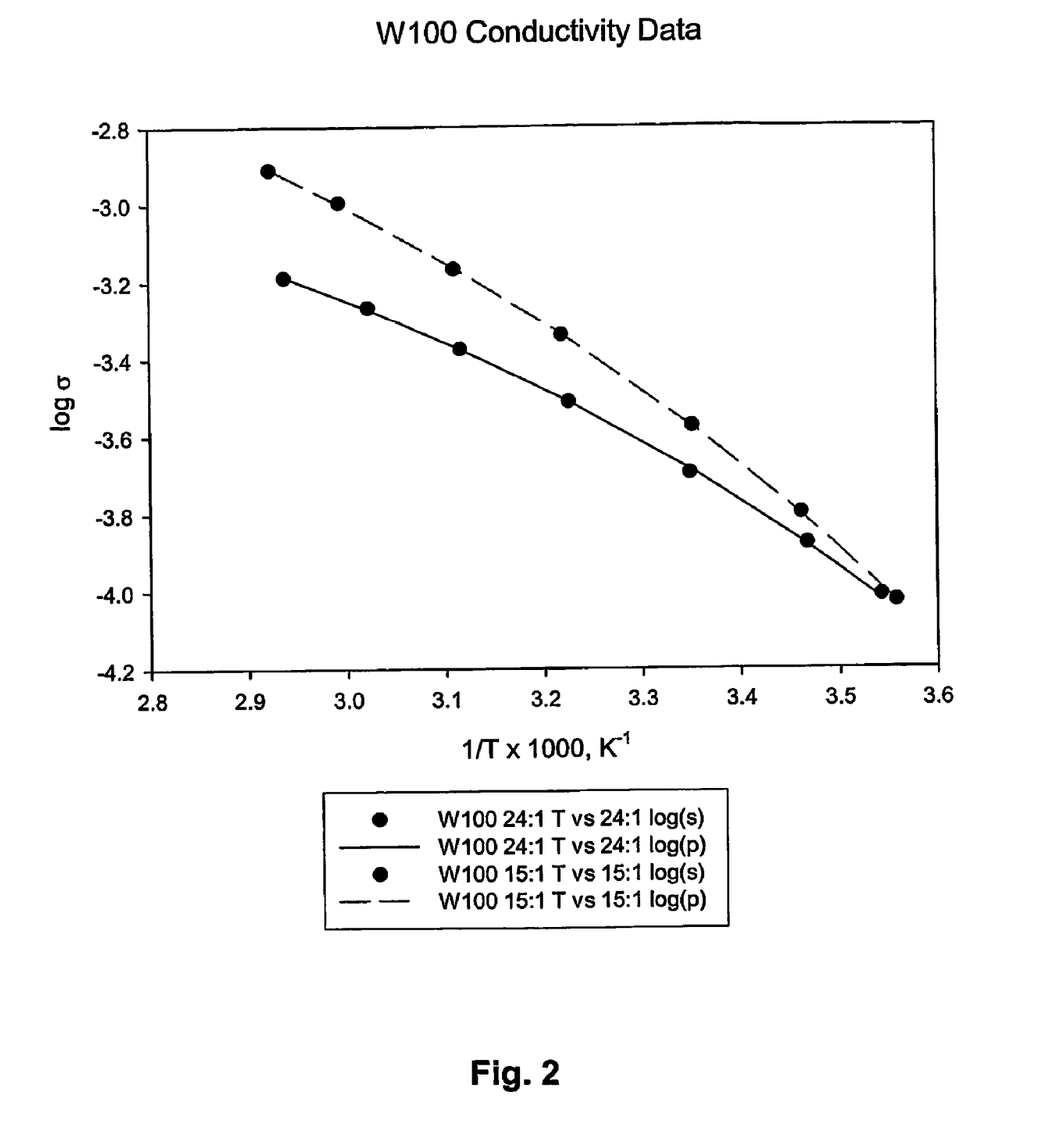
FIG. 2 is a plot of conductivity derived from impedance measurements for several side chain oxygen to lithium (EO:Li) ratios.

FIG. 2 shows the results of impedance measurements yielding conductivity calculations, which were recorded at various temperatures and plotted. It is apparent that an EO:Li ratio of 15:1 yields the best conductivity for our Sample W100. This data was then fit to the Vogel-Tamman-Fulcher (VTF) equation, $$\sigma = AT^{-1/2}\exp\left[\frac{-B}{T-T_0}\right], \text{ where } A \frac{SK^{1/2}}{(cm)}$$

and B (K−1) are constants and To (K) is the ideal glass transition temperature. The equation parameter B, is related to activation energy ($E_a$) by a constant such that, $$E_a = B \times \left(8.31 \frac{J}{molK}\right)$$

(Table 5).

TABLE 5

Conductivity Data for Sample W100

| EO:Li | $\sigma$ @ 25° C. (S/cm) | $\sigma$ @ 37° C. (S/cm) | $E_a$ (kJ/mol) | $T_o$ (K) |
|---|---|---|---|---|
| 24.8:1 | $2.01E^{-4}$ | $3.08E^{-4}$ | 3.07 | 202 |
| 15.1:1 | $2.66E^{-4}$ | $4.58E^{-4}$ | 4.37 | 196 |

Table 6 summarizes the conductivity measurements and VTF derived data for both the 24.8:1 and 15:1 EO:Li doping ratios. The values of temperature and conductivity are presented in the forms of 1/T×1000 and log $\sigma$, respectively, so that the data can be easily plotted (as in FIGS. 2 and 6) and related to the VTF equation. The corresponding calculated log $\sigma$ values derived from the VTF fit are also presented for data point for comparison.

TABLE 6

Conductivity Measurements and VTF Derived Data

| 24.8:1 | | | 15:1 | | |
|---|---|---|---|---|---|
| Experimental Data | | Calculated Data | Experimental Data | | Calculated Data |
| 1/T × 1000 | log σ | VTF fit | 1/T × 1000 | log σ | VTF fit |
| 3.5430 | −4.0117 | −4.0231 | 3.5581 | −4.0268 | −4.0289 |
| 3.4680 | −3.8781 | −3.8821 | 3.4620 | −3.7992 | −3.8035 |
| 3.3495 | −3.6963 | −3.6861 | 3.3518 | −3.5746 | −3.5754 |
| 3.2263 | −3.5113 | −3.5108 | 3.2191 | −3.3382 | −3.3361 |
| 3.1158 | −3.3744 | −3.3735 | 3.1099 | −3.1659 | −3.1633 |
| 3.0225 | −3.2651 | −3.2700 | 2.9936 | −2.9947 | −2.9986 |
| 2.9382 | −3.1868 | −3.1846 | 2.9235 | −2.9097 | −2.9081 |

Electrochemical Stability. For the measurement of the electrochemical stability window of the polymer electrolyte, stainless steel type 2032 button cell assemblies were used, with a stainless steel disc as a working electrode and a lithium metal disc as a counter electrode. The measurement cell was assembled in an argon-filled dry box.

Figure 3:
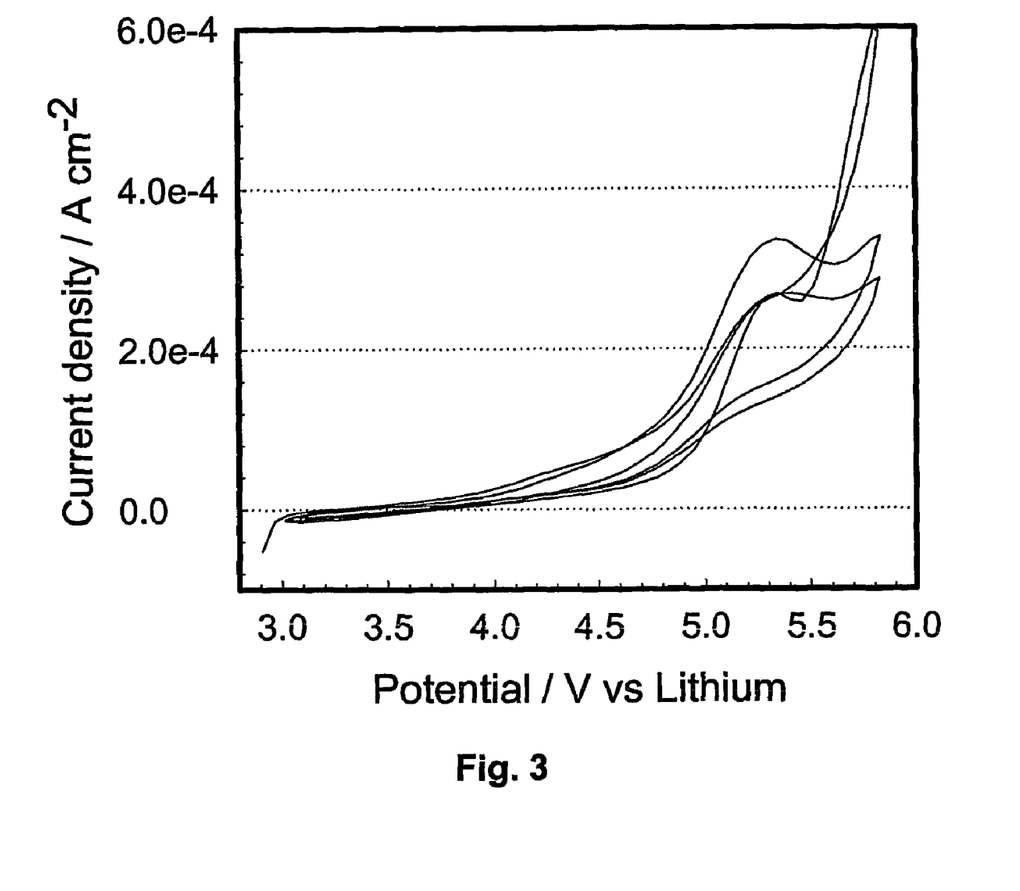
FIG. 3 is a plot of potential vs. current density for Sample W100 Doped with LiTFSI (EO:Li=32:1).

FIG. 3 shows the electrochemical stability of the polymer electrolyte measured by using ZAHNER electrochemical workstation IM6 with scan rate of 5 mV/sec from 2.8 V to 6.0 V measured at 25° C. The first scan cycle displays small current increase from 4.0 V onward. Successive scans show that Sample W100 doped with LiTFSI can be cycled up to 4.5 V without an additional decomposition.

Viscosity (η): The viscosity of Sample W100 (see Table 7) was measured by using a Brookfield type viscometer (DV-II+) with a spindle speed of 50 RPM measured at 25° C.

TABLE 7

| Temp (C.) | EO:Li | η (cPs) |
|---|---|---|
| 25.0 | 32:1 | 26.50 |

Example 2

Figure 4A:
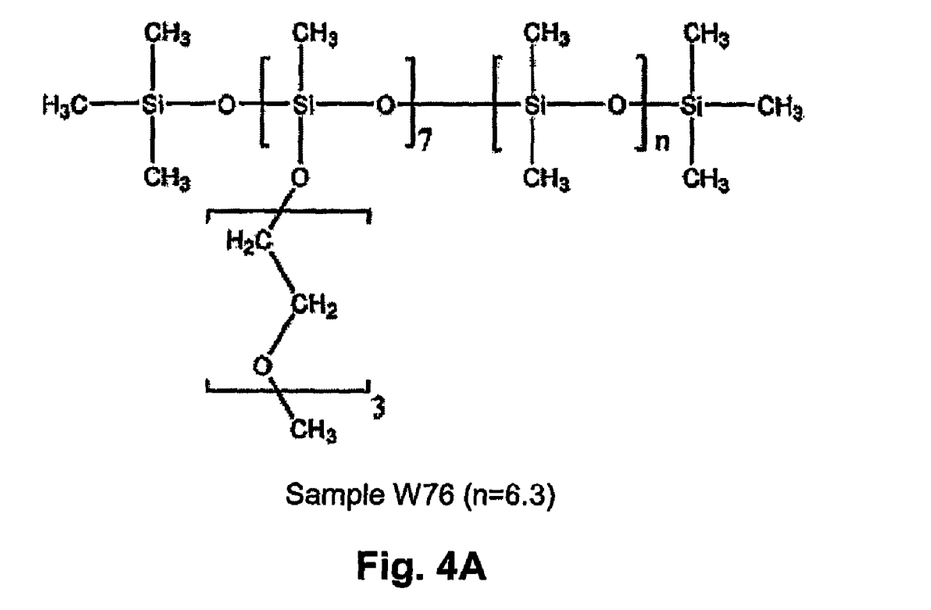
FIGS. 4A and 4B represent the structures of the three linear polysiloxane polymers of Example 2.
Figure 4B:
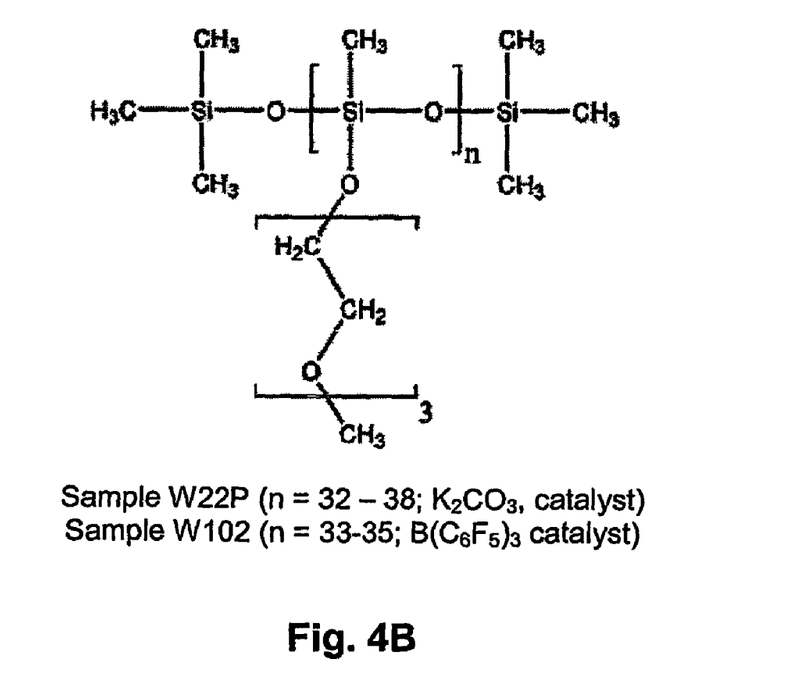

To further explore the properties of related polymer electrolytes, the three linear polysiloxane polymers shown in FIGS. 4A and 4B were synthesized. The liquid samples were doped with LiTFSI at various concentrations before measuring conductivity. A previous study found the 32:1 EO:Li ratio to be the optimum ratio for maximum conductivity, but the polymers examined in that study were double-comb polysiloxanes. (See, Hooper, supra.)

Past studies have measured conductivities that could be considered commercially viable (Ibid.), but the polysiloxanes that were studied had to be meticulously synthesized at the laboratory level. Trying to convert these syntheses to commercial volumes would likely prove to be too difficult and costly. Thus, the methyl polysiloxane samples have the advantage of having been synthesized by much simpler schemes from the readily available starting materials poly (methylhydrosiloxane), PMHS, and poly(ethylene glycol), PEO, as a step toward making the transition from laboratory to market.

For comparison purposes, the liquid polymers W22P, W76, W100, and W102 were synthesized at the Organosilicon Research Center at the University of Wisconsin-Madison. The liquid samples were dried on a high vacuum line until ultimate pressure was reached (W22P, 1.5×10⁻⁵ torr; W76, 2.2×10⁻⁵ torr; W100, 9.5×10⁻⁵ torr; W102, 9.5×10⁻⁵ torr).

Specifically, and by way of example, Sample W76 (FIG. 4A) was synthesized in the same way as W100 except omitting Step 1 ("Ring Opening Polymerization Synthesizing a $MD_n^H M$ (n~8) Intermediary") above. The materials used were:

55% PMHS-co-PDMS ($M_w$=900~1200 from Gelest Inc., 25.0 g, 0.167 mol Si—H)

Tri(ethyleneglycol) monomethyl ether (Aldrich, 27.38 g, 0.167 mol);

$B(C_6F_5)_3$ (Aldrich, 0.77 g, 1.5 mmol);

Toluene (150 ml).

Sample W76 (27 g) was thus obtained and tested. Spectra data (IR, NMR) for W76 were similar to that for W100 except for the presence of an additional absorption band at −19~−22 ppm on the $^{29}Si$ NMR spectrum. Sample W76, where the PEO side chains are attached to the siloxane backbone through Si—O bonds, is a novel material for use as an electrolyte. (Note that in terms of General Formula I, the precursor for Sample W76, n~7 and n~6.3. Generally, in the present invention, m may range from 0 to about 20, or more preferably from 0 to about 8, and most preferably should be about 0).

Similarly, Sample W102 (FIG. 4B) was synthesized according to Step 2 in the Sample W100 preparation above (i.e., omitting step 1). The materials used were:

PMHS (n~34) (Gelest Inc., 41.59 g, 0.638 mol Si—H);

Tri(ethyleneglycol) monomethyl ether (Aldrich, 104.59 g, 0.638 mol);

$B(C_6F_5)_3$ (Aldrich, 0.17 g, 0.33 mmol);

Toluene (220 ml)

Sample W102 (139.3 g) was thus obtained and tested. Spectra (IR, NMR) data for W102 were similar to W100.

Referring to FIG. 4B, it may be seen that Sample 22P is almost identical to Sample W102. The difference in the length of the silicon oxide backbone results from the use of potassium carbonate ($K_2CO_3$) as a catalyst in formulating Sample W22P versus the use of tris(pentafluorophenyl)boron ($B(C_6F_5)_3$) as a catalyst in formulating Sample W102. Importantly, the boron-containing catalyst results in more precise control of the length of the silicon oxide backbone, and a significant improvement in performance. The use of a boron-containing catalyst is therefore much preferred to other catalysts.

Viscosity (η): The viscosity of Samples W22P, W76, and W102 (see Table 8) was measured using the same method as Sample W100 (using a Brookfield type viscometer (DV-II+) with a spindle speed of 50 RPM measured at 25° C.).

TABLE 8

| Sample | Temp (C.) | EO:Li | η (cPs) |
|---|---|---|---|
| W22P | 25° C. | 32:1 | 96.00 |
| W76 | 25° C. | 32:1 | 113.20 |
| W102 | 25° C. | 32:1 | 64.13 |

Polymer Electrolyte Preparation.

Doped polymer samples were prepared by direct mixing of the salt with the polymer. Both polymer and the calculated amount of salt (side-chain oxygen to lithium ion ratio) were placed in a Nalgene cup in the dry box and sealed in a custom drying tube with a stir bar. Once out of the dry box, the tube was placed on a Schlenk line to allow the polymer and salt to stir under an argon flow until a homogeneous mixture was achieved.

Figure 5:
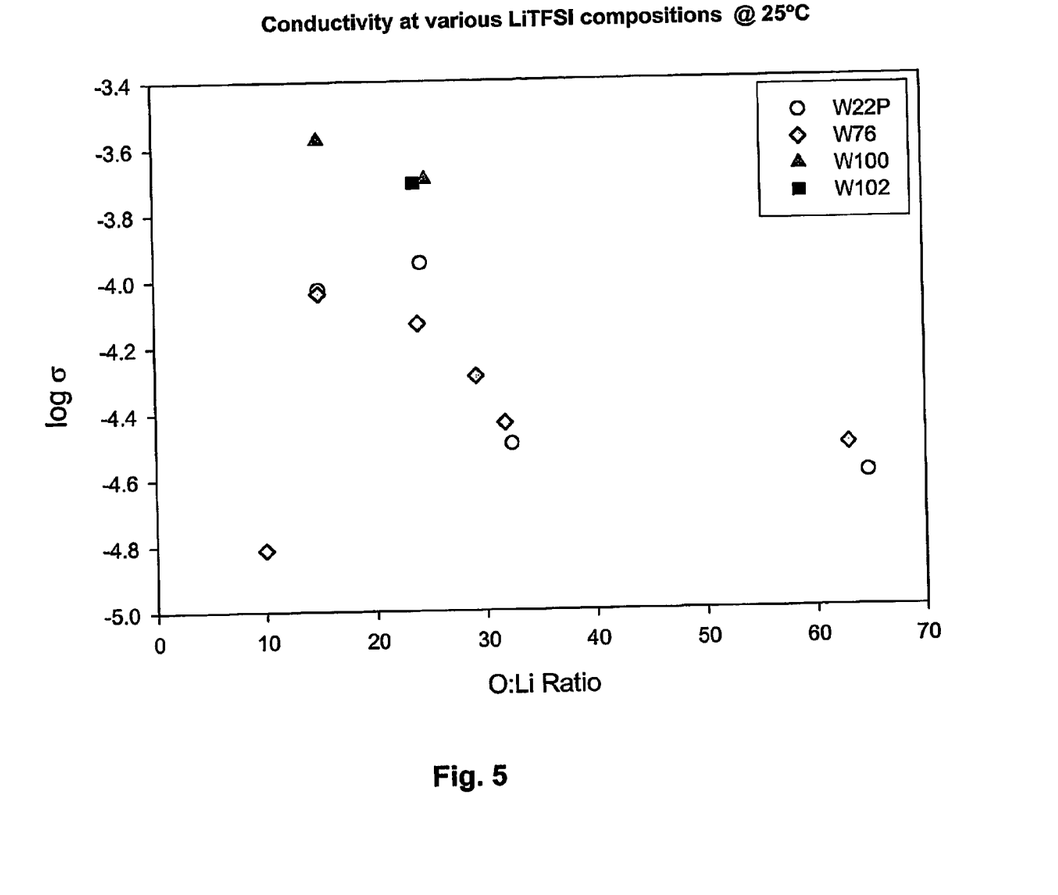
FIG. 5 is a plot of conductivity derived from impedance measurements of the samples of Example 2.

FIG. 5 is a plot of conductivity derived from impedance measurements of the samples of Example 2. O-ring sealed sandwich conductivity cells were loaded in the dry box of each sample using one of three containment rings. The geometric factor, 1/A, for the rings ranged from 0.208 to 0.293 cm$^{-1}$. Ionic conductivities were calculated with the equation s=1/R*1/A, where s is conductivity and R is resistance. Resistance was calculated from the impedance (Z) using the equation, R=Z*cos(q) where q is the phase angle and Z is the impedance. The impedance was measured on a Princeton Applied Research Potentiostat/Galvanostat Model 273A with a Model 1025 Frequency Response Analyzer operated under computer control using PAR PowerSine software. The frequency ranged from 75.0 Hz to 100 kHz and the default AC amplitude of 10 mV was used for each measurement. Measurements were taken at temperatures ranging from 0 to 70° C. by placing the conductivity cell inside a condenser attached to a Brinkman MGW Lauda RM 6 variable temperature, circulating bath. Conductivity was calculated from the impedance measurements and plotted with respect to temperature. The plot of FIG. 5 was fit to the VTF equation, (See, Fulcher, G. S. J. Am. Ceram. Soc. 1925, 8, 339) in order to calculate the activation energy from the equation parameters. The samples W100 (tested at EO:Li doping ratios of 15:1 and 24.8:1) and W102 (tested at a EO:Li doping ratio of 24.8:1) outperformed the other samples tested. It is anticipated that W102 would also perform well at the 15:1 level. From FIG. 5, there appears to be a trend over all samples that there is an optimum EO:Li doping ratio range of about 5:1 to 50:1, more preferably about 12:1 to 28:1, even more preferably about 15:1 to 25:1, and most preferably about 15:1.

Figure 6:
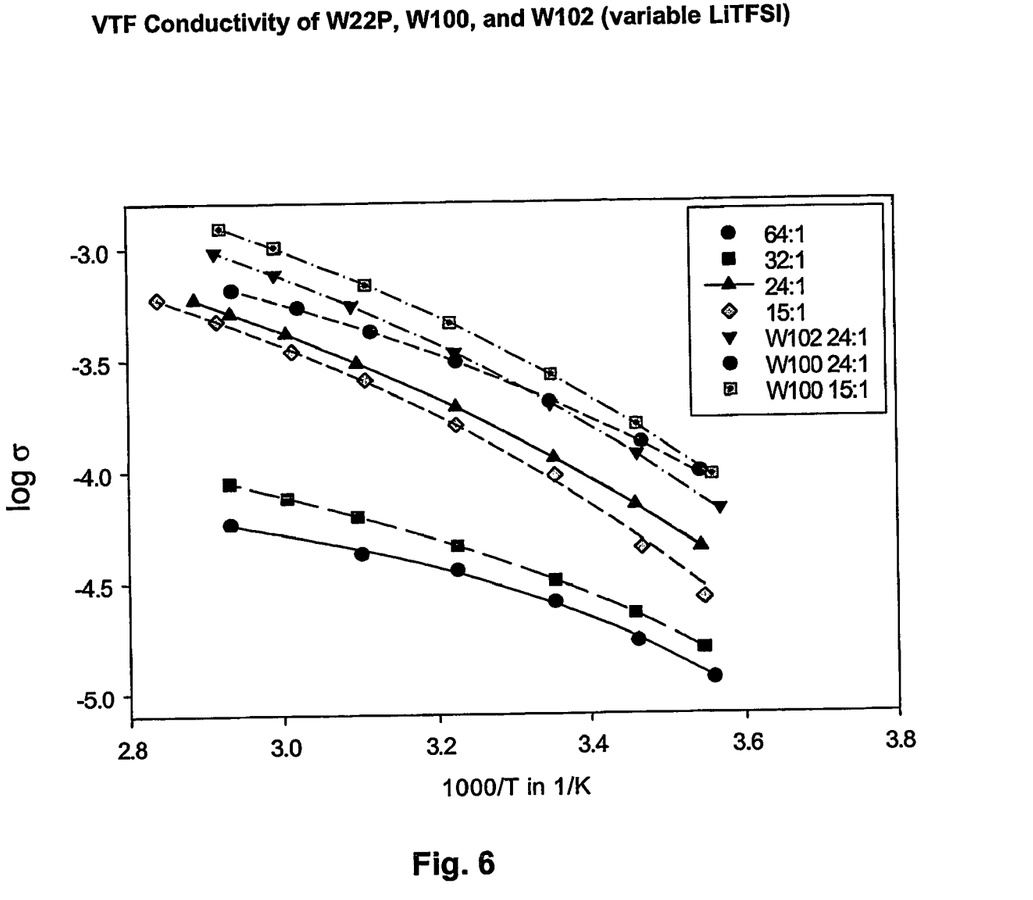

FIG. 6 is a plot of VTF derived conductivity for various concentrations of LiTFSI. It is evident that the sample W100 doped at 15:1 outperforms all other samples tested throughout the test range. It should be apparent that the present invention solves the long-felt need to create safe, high energy, lightweight electrochemical storage devices having liquid electrolytes. Batteries containing the present electrolyte would be inherently safer than those with more volatile, flammable, and unstable electrolytes, and have significantly better performance due to the lower impedance and increased conductivity. Additionally, the cost of manufacturing the electrolyte of the present invention is anticipated to be lower than other alternate electrolytes.

Example 3

Following the same synthetic procedures as in Example 1, but varying the amount of starting materials, Sample W119 was synthesized.

Step 1: Ring Opening Polymerization Synthesizing a $MD_n^HM$ (n=~4)

Commercially available Hexamethyldisiloxane HMDS (Aldrich, 41.44 g or 0.255 mol), 1,3,5,7-tetramethylcyclotetrasiloxane $D_4^H$ (Gelest Inc., 61.24 g or 0.255 mol) (General Formula III), and concentrated sulfuric acid $H_2SO_4$ (Fisher Scientific, 2.46 g) were used as precursors for the product $MD_n^HM$(n=~4) (78 g).

NMR analysis showed the following data: $^1$H NMR (in CDCl$_3$): 4.70 ppm (broad, 1H, Si—H), 0.21 ppm~0.12 ppm (m, 7.4H, Si—CH$_3$). $^{29}$Si NMR (in CDCl$_3$): 8.78 ppm (m, OSi(CH$_3$)$_3$), −36.54 ppm (m, Si—H).

Step 2: Addition of PEO side chains

Tri(ethyleneglycol) monomethyl ether (Aldrich, 65.85 g, 0.402 mol), $MD_n^HM$ (n=~4) (40.39 g, 0.402 mol Si—H), Tris(pentafluorophenyl)boron B(C$_6$F$_5$)$_3$ (Aldrich, 0.104 g, 0.202 mmol) were used to afford the colorless liquid product designated Sample W119 (96.7 g). Referring to General Formula II (as well as the final product in FIG. 1), n=~4.

Spectroscopic Data: IR showed no HO groups (at 3300~3500 cm$^{-1}$) and no Si—H (at 2160 cm$^{-1}$) present. $^1$H NMR (in CDCl$_3$): 3.70~3.30 ppm (m, 12H, CH$_2$), 3.15 ppm (s, 3H, OCH$_3$), 0.05~-0.10 ppm (m, 7.4 H, Si—CH$_3$).

Viscosity was measured at 30.00 cPs.

Conductivity was measured at 2.10×10$^{-4}$ Scm$^{-1}$ at 25.1° C. (at doping level of O/Li=24, using LiTFSI).

Example 4

Following the same synthetic procedures as in Example 1, but varying the amount of starting materials, Sample W168 (n=~6) was synthesized.

Step 1: Ring Opening Polymerization Synthesizing a $MD_n^HM$ (n=~6)

Commercially available Hexamethyldisiloxane HMDS (Aldrich, 19.59 g, 0.121 mol), 1,3,5,7-tetramethylcyclotetrasiloxane $D_4^H$ (Gelest Inc., 43.42 g, 0.181 mol), and concentrated sulfuric acid $H_2SO_4$ (Fisher Scientific, 1.59 g) were used as precursors for the product $MD_N^HM$ (n=~6) (46.5 g).

NMR analysis yielded the following data: $^1$H NMR (in CDCl$_3$): 4.70 ppm (broad, 1H, Si—H), 0.21 ppm~0.12 ppm (m, 6.1H, Si—CH$_3$). $^{29}$Si NMR (in CDCl$_3$): 8.92 ppm (m, OSi(CH$_3$)$_3$), −36.72 ppm (m, Si—H).

Step 2: Addition of PEO side chains

Tri(ethyleneglycol) monomethyl ether (Aldrich, 39.72 g, 0.242 mol), $MD_n^HM$ (n=~6) (21.56 g, 0.243 mol Si—H), and Tris(pentafluorophenyl)boron B(C$_6$F$_5$)$_3$ (Aldrich, 0.150 g, 0.293 mmol) were used to afford the colorless liquid product designated Sample W168 (59.0 g). Referring to General formula II (as well as the final product in FIG. 1), n=~6.

Spectroscopic Data: IR showed no HO groups (at 3300~3500 cm$^{-1}$) and no Si—H (at 2160 cm$^{-1}$) present. $^1$H NMR (in CDCl$_3$): 3.70~3.30 ppm (m, 12H, CH$_2$), 3.15 ppm (s, 3H, OCH$_3$), 0.05~-0.10 ppm (m, 5.9H, Si—CH$_3$).

Example 5

Following the same synthetic procedures as in Example 1, but varying the amount of starting materials, Sample W169 (n=~11) was synthesized.

Step 1: Ring Opening Polymerization Synthesizing a $MD_n^HM$ (n=~11)

Commercially available Hexamethyldisiloxane HMDS (Aldrich, 8.28 g, 0.051 mol), 1,3,5,7-tetramethylcyclotetrasiloxane $D_4^H$ Gelest Inc., 42.84 g, 0.179 mol), and concentrated sulfuric acid $H_2SO_4$ (Fisher Scientific, 1.58 g) were reacted at 75° C. for 72 hours to afford the product $MD_n^HM$ (n=~1) (46.5 g).

NMR analysis yielded the following data: $^1$H NMR (in CDCl$_3$): 4.70 ppm (broad, 1H, Si—H), 0.21 ppm~0.12 ppm (m, 4.7 H, Si—CH$_3$). $^{29}$Si NMR (in CDCl$_3$): 8.87 ppm (m, OSi(CH$_3$)$_3$), −36.31 ppm (m, Si—H).

Step 2: Incorporation of PEO side chains:

Tri(ethyleneglycol) monomethyl ether (Aldrich, 45.77 g, 0.279 mol), $MD_n^HM$ (n=~11) (21.93 g, 0.291 mol Si—H), and Tris(pentafluorophenyl)boron B(C$_6$F$_5$)$_3$ (Aldrich, 0.101 g, 0.197 mmol) were used to afford the colorless liquid product designated Sample W169 (62.8 g). Referring to General formula II (as well as the final product in FIG. 1), n=~11.

Spectroscopic Data: IR showed no HO groups (at 3300~3500 cm$^{-1}$) and no Si—H (at 2160 cm$^{-1}$) present. $^1$H NMR (in CDCl$_3$): 3.70~3.30 ppm (m, 12H, CH$_2$), 3.15 ppm (s, 3H OCH$_3$), 0.05~-0.10 ppm (m, 4.7H, Si—CH$_3$).

The specific implementations disclosed above are by way of example and for enabling persons skilled in the art to implement the invention only. We have made every effort to describe all the embodiments we have foreseen. There may be embodiments that are unforeseeable or which are insubstantially different. We have further made every effort to describe the invention, including the best mode of practicing it. Any omission of any variation of the invention disclosed is not intended to dedicate such variation to the public, and all unforeseen or insubstantial variations are intended to be covered by the claims appended hereto. Accordingly, the invention is not to be limited except by the appended claims and legal equivalents.

We claim:

1. A battery, comprising:
    a nonaqueous liquid type polymeric electrolyte that includes at least one ionizable salt and a poly(siloxane-g-ethylene oxide) represented by the formula wherein
n=4 to 20;
m=0 to 20;
R$_1$, R$_2$, R$_3$, R$_5$, R$_6$, R$_7$, R$_8$, R$_9$ and R$_{10}$ are each chosen from a group consisting of: methyl, ethyl, propyl, and butyl; and
R$_4$ is [—O-(polyalkylene oxide)-R$_{11}$] wherein R$_{11}$ is an alkyl group, and a terminal oxygen in the polyalkylene oxide is linked directly to R$_{11}$.

2. The battery of claim 1, wherein n is 4 to 12.
3. The battery of claim 1, wherein n is 8.
4. The battery of claim 1, wherein m is 0 to 8.
5. The battery of claim 1, wherein m is 0.
6. The battery of claim 1, wherein n=4 to 12 and m is 0.
7. The battery of claim 1, wherein n is 8 and m is 0.
8. The battery of claim 1, wherein the R$_4$ includes a poly(ethylene oxide) ether.
9. The battery of claim 8, wherein the poly(ethylene oxide) ether is a methyl ether.
10. The battery of claim 8, wherein the poly(ethylene oxide) includes 2 to 10 ethylene oxide units.
11. The battery of claim 8, wherein the poly(ethylene oxide) includes 3 ethylene oxide units.
12. The battery of claim 1, wherein the dissolved ionizable salt is an alkali metal salt.
13. The battery of claim 12, wherein the alkali metal salt includes a lithium salt.
14. The battery of claim 12, wherein the said salt includes at least one salt selected from the group consisting of: LiN(SO$_2$CF$_3$)$_2$(LiTFSI), LiClO$_4$, LiBF$_4$, LiAsF$_6$, LiPF$_6$, LiCF$_3$SO$_3$, Li(CF$_3$SO$_2$)$_2$N, LiC(CF$_3$SO$_2$)$_3$, LiN(SO$_2$C$_2$F$_5$)$_2$, lithium bis(chelato) borate having five to seven membered rings, and lithium alkyl fluorophosphates.
15. The battery of claim 1, wherein a side chain oxygen vs. lithium ratio of the electrolyte is 5:1 to 50:1.
16. The battery of claim 1, wherein the side chain oxygen vs. lithium ratio of the electrolyte is about 10:1 to about 35:1.
17. The battery of claim 1, wherein the side chain oxygen vs. lithium ratio of the electrolyte is 12:1 to 28:1.
18. The battery of claim 1, wherein the side chain oxygen vs. lithium ratio of the electrolyte is about 15:1 to about 25:1.
19. The battery of claim 1, wherein the side chain oxygen vs. lithium ratio of the electrolyte is about 15:1.
20. The battery of claim 1, wherein the ionizable salt includes a quaternary ammonium salt having an anion selected from the group consisting of: ClO$_4^-$, BF$_4^-$, AsF$_6^-$, FF$_6^-$, CF$_3$SO$_3^-$, (CF$_3$SO$_2$)$_2$N$^-$, (CF$_3$SO$_2$)$_3$C$^-$, (C$_2$F$_5$SO$_2$)$_2$N$^-$, PF$_3$(C$_2$F$_5$)$_3^-$, PF$_3$(CF$_3$)$_3^-$, and B(C$_2$O$_4$)$_2^-$.
21. The battery of claim 1, further comprising:
    boron detectable by at least one technique chosen from the following: mass spectroscopy, nuclear magnetic resonance (NMR), X-ray, and Fourier Transform Infrared Spectroscopy (FTIR).

* * * * *